May 29, 1945.　　C. D. JACKSON　　2,377,236
PORTABLE SAW MILL
Filed March 7, 1941　　7 Sheets-Sheet 1

Fig. 1.

Inventor
Clinton D. Jackson

By Clarence A. O'Brien

Attorney

May 29, 1945.　　　C. D. JACKSON　　　2,377,236
PORTABLE SAW MILL
Filed March 7, 1941　　　7 Sheets-Sheet 2

Inventor
Clinton D. Jackson
By Clarence A. O'Brien
Attorney

May 29, 1945.  C. D. JACKSON  2,377,236
PORTABLE SAW MILL
Filed March 7, 1941  7 Sheets-Sheet 3

Fig. 3.

Inventor
Clinton D. Jackson

By Clarence A. O'Brien

Attorney

May 29, 1945.   C. D. JACKSON   2,377,236
PORTABLE SAW MILL
Filed March 7, 1941   7 Sheets-Sheet 6

Inventor
Clinton D. Jackson

Attorney

May 29, 1945.  C. D. JACKSON  2,377,236
PORTABLE SAW MILL
Filed March 7, 1941  7 Sheets-Sheet 7

Inventor
Clinton D. Jackson
By Clarence A. O'Brien
Attorney

Patented May 29, 1945

2,377,236

UNITED STATES PATENT OFFICE 2,377,236

PORTABLE SAWMILL

Clinton D. Jackson, Mondovi, Wis.

Application March 7, 1941, Serial No. 382,252

1 Claim. (Cl. 143—125)

My invention relates to improvements in portable sawmills, and the primary object of my invention is to provide a combination of features resulting in a machine which is readily transportable, can be quickly set up, minimizes labor in operation, has special provision for maintaining operating safety, manufactures rough lumber to a high degree of size accuracy, and when adequately powered has a production rate equal to that of other types of efficient, portable mills.

Portability is secured by supporting the entire mill and carriage on a single axle equipped with pneumatic tired wheels and placed across the midpoint of the truss or frame, with springs between the axle and frame. A socket fixed to the rear end of the frame and a companion ball on the draft unit provide the connection for drawing the mill from place to place, and accurate setting up is secured by the use of jacks to properly support the frame on the ground and properly level the frame with the wheels off the ground. The electrically operated receder operates to open the head blocks and pull the electrically operated dog thereby reducing the amount of manual labor involved in their operation and speeding up production by their instantaneous action. Operating safety is promoted by a carriage offsetting device which throws the carriage and log away from the saw during gig back travel. Accuracy of manufacture is secured by having wheels fixed at frequent intervals on the truss frame rather than on the carriage frame, and additional safety is provided by the rail guide attached to the truss frame controlling the carriage movement parallel to the plane of the saw cut.

Other important objects and advantages of my invention will be apparent from a reading of the following description and the appended drawings wherein for illustrative purposes I have shown a preferred embodiment of my invention.

Referring in detail to the drawings, the numeral 5 generally designates the chassis frame preferably composed of upper and lower side tubes 6 and 7, respectively, spaced and connected by verticals 8 and diagonal braces 9, the upper and lower side tubes being laterally spaced and connected by cross tubes 10 and 11, respectively, (Figure 10) with the lower side tubes 7 angularly upset at their ends to join the extremities of the upper side tubes 6 at 12. An axle 13 secured to the lower side tubes 7 adjacent the middle thereof has ground engaging wheels 14 to roll on the ground 15. Four jacks 16, one being secured to depend at each corner of the chassis frame, are provided with independent operating means 17 enabling jacking the chassis frame at the desired level with respect to the ground regardless of the evenness or unevenness of the ground with the wheels 14 off the ground if desired. Suitable draft means (not shown) can be provided for attaching the chassis frame to a tractor (not shown) to transport the mill from place to place.

Figure 2:
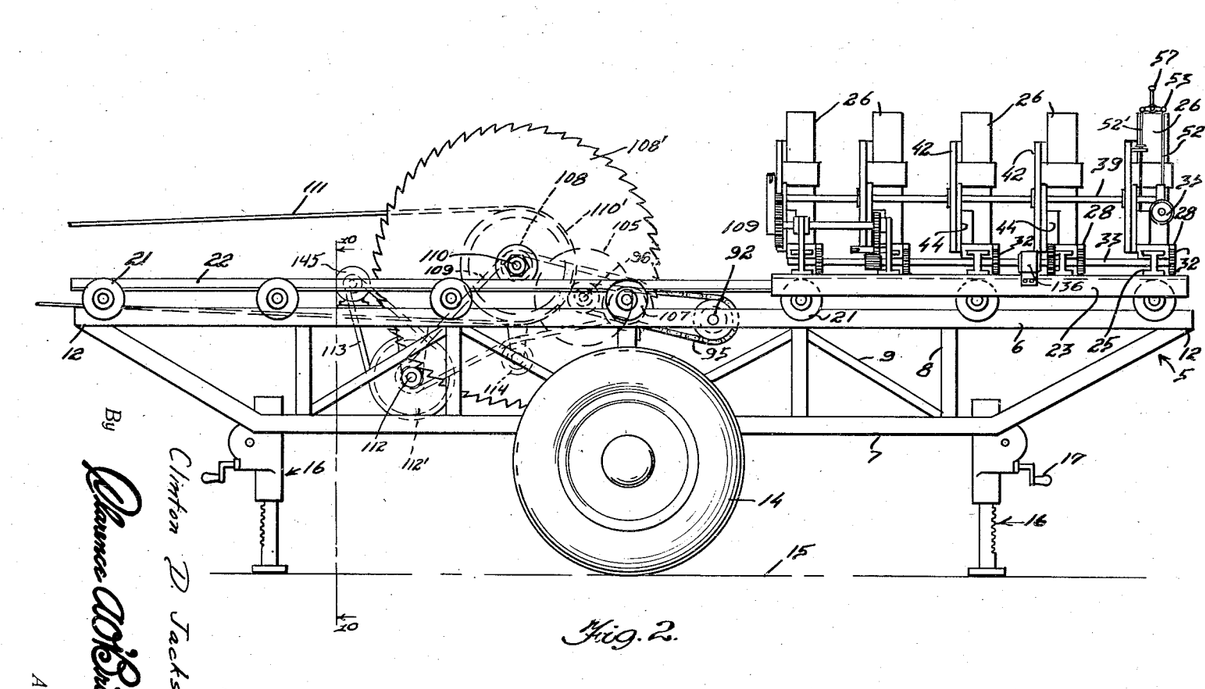
Figure 2 is a general side elevational view thereof showing the levelling jacks in position.
Figure 10:
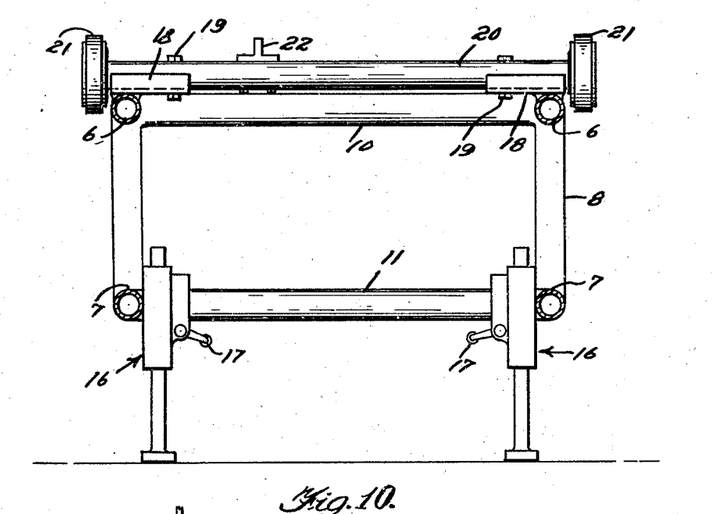
Figure 10 is a transverse vertical sectional view taken along the line 10—10 of Figure 2 and looking toward the left in the direction of the arrows.

At intervals along the upper side tubes 6 are transversely arranged semi-cylindrical holders 18 which are secured to the tops of the side tubes and are equipped with bolts 19 which serve the dual purpose of passing through replaceable shims on the holders and through tubular cross members 20 to hold the cross members and shims in place, the shims being used selectively to change the level of the cross members when necessary or desirable to compensate for wear in the frictionless wheels 21 which are mounted on the ends of the cross members 20 outside of the sides of the chassis frame as shown in Figure 10. The carriage guiding track comprising an inverted T-shaped rail 22 is secured on the tops of the cross members 20 at one side of the middle position as also indicated in Figure 10. The cross members 20 with their frictionless wheels 21 are spaced at selected intervals all along the upper side tubes as indicated in Figure 2.

Figure 4:
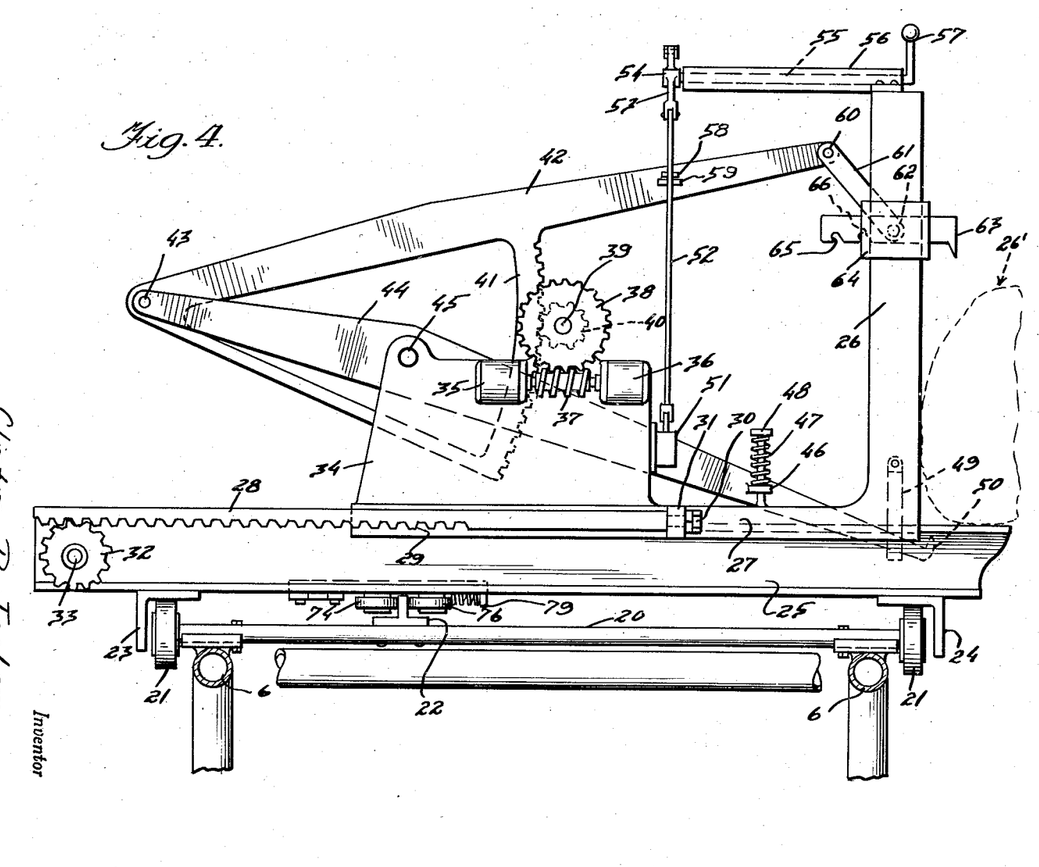
Figure 4 is an enlarged fragmentary sectional and end elevational view of the carriage and supporting frame or chassis and showing the arrangement of the electrically operated dogs and the control switch arrangement thereof.

The carriage is mounted relative to the chassis frame by riding on the wheels 21, the carriage having inverted L-shaped tracks 23, 24 with the horizontal part resting on the wheels 21 and with the vertical flange protectively positioned outside of the said wheels as shown in Figure 4 of the drawings.

The carriage is composed of transversely arranged I-beams 25 which extend beyond the sides of the chassis frame on both sides but extend to a substantially greater distance on the feeding side of the device to provide support for the logs or the like 26' as shown in Figure 4 of the drawings, the I-beams being fastened to the tops of the tracks 23, 24. Five of the I-beams 25 and associated log-handling mechanism are shown in the drawings.

Figures 5, 6:
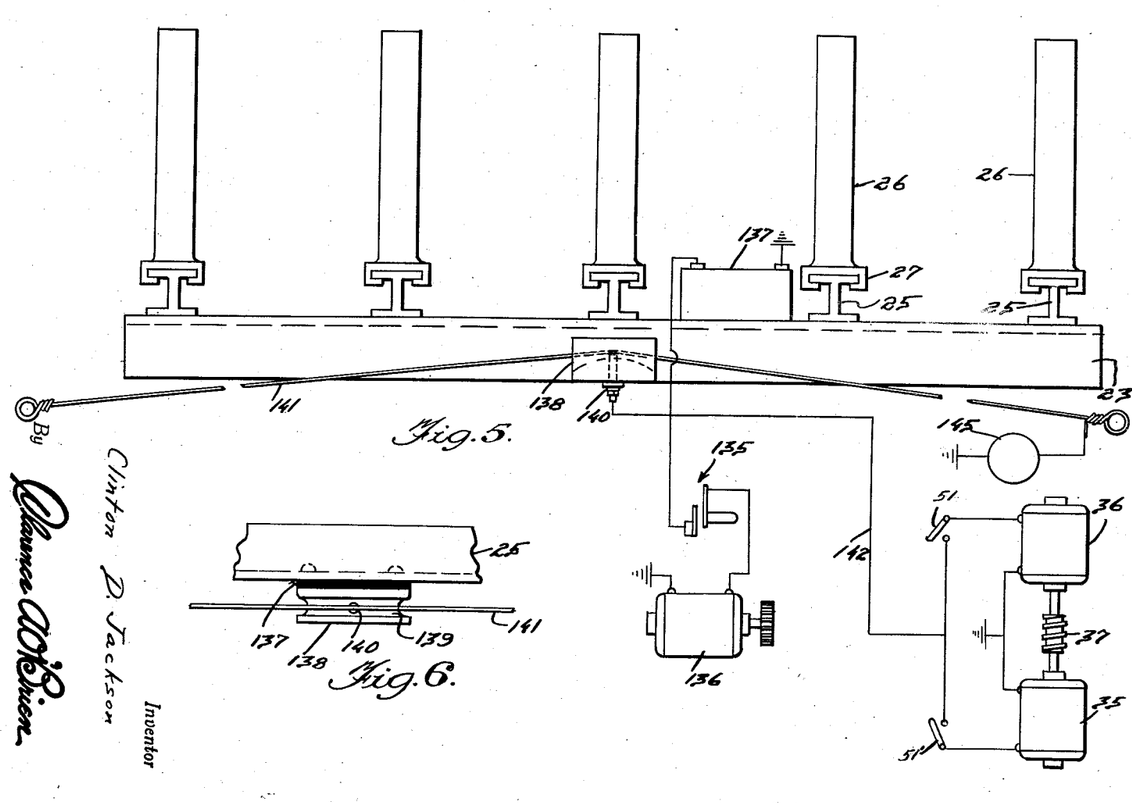
Figure 5 is a schematic side elevational view of the carriage showing the arrangement of the transversely slidable knees and the contactor shoe arrangement for bringing electric current to operate the motor means on the carriage and receder and showing the electrical connections.
Figure 6 is a fragmentary bottom plan view showing the contactor shoe in contact with the trolley wire.

On each I-beam is slidably mounted an L-shaped standard or knee 26 having a channel-shaped horizontal lower part 27 riding on and embracing the edges and the upper and lower sides of the upper flanges of the corresponding I-beam, as shown in Figure 5 of the drawings. The channeled horizontal part 27 has attached to one side thereof a horizontal rack bar 28. One end of the rack bar has a shank passing through an opening in a bracket 31 on the side of the horizontal part 27 with nuts 30 threaded on the shank against one side of the bracket to hold the rack bar in place. The teeth 29 on the rack 28 mesh with corresponding pinions 32 fixed on a shaft 33 journaled parallel to and outside of the track 23 through the I-beams. The racks are longitudinally adjustable to predetermine the starting and stopping positions of the standards 26 imparted thereto by the controlled rotation of the shaft 33 and hence of the pinions 32.

Rising from each horizontal part 27 is a plate 34 on which are mounted small axially aligned electric motors 35 and 36, respectively, which operate in opposite directions and have their shafts connected to opposite ends of an irreversible worm 37 which is meshed with a worm wheel 38 fixed on a shaft 39 rotatably supported on the plate 34 of the various similar assemblies. The shaft 39 also has fixed thereon a small pinion 40 which is meshed with a sector gear portion 41 depending from the middle region of the upper lever or jaw 42 which has its left hand end (as seen in Figure 4) pivoted at 43 to the left hand end of the lower lever or jaw 44, which together form the log gripping tongs. The lower lever or jaw 44 is pivoted spaced from its left hand end at 45 on the upper part of the plate 34, the lever 44 jaw working between the upper lever or jaw 42 and the plate 34 and having a lug 46 working under an expanding hold-down spring 47 on a vertical projection 48 on the horizontal part 27 adjacent the right hand end of the lever. The right hand end of the lower lever or jaw 44 works through a confining guide 49 on the lower part of the standard 26, beyond which it is provided with an upturned point or hook 50 for gripping the lower part of the log 26' or the like as indicated in Figure 4.

On the right hand end of the plate 34 is a switch 51 which is operated by a vertical rod 52 which depends from one end of a cross lever 53 which is mounted intermediate its ends at 54 on a shaft 55 carried in a horizontal tube 56 fastened to the upper end of one of the standards 26. The shaft 55 is provided with a handle 57 to be operated by the sawyer.

Figure 3:
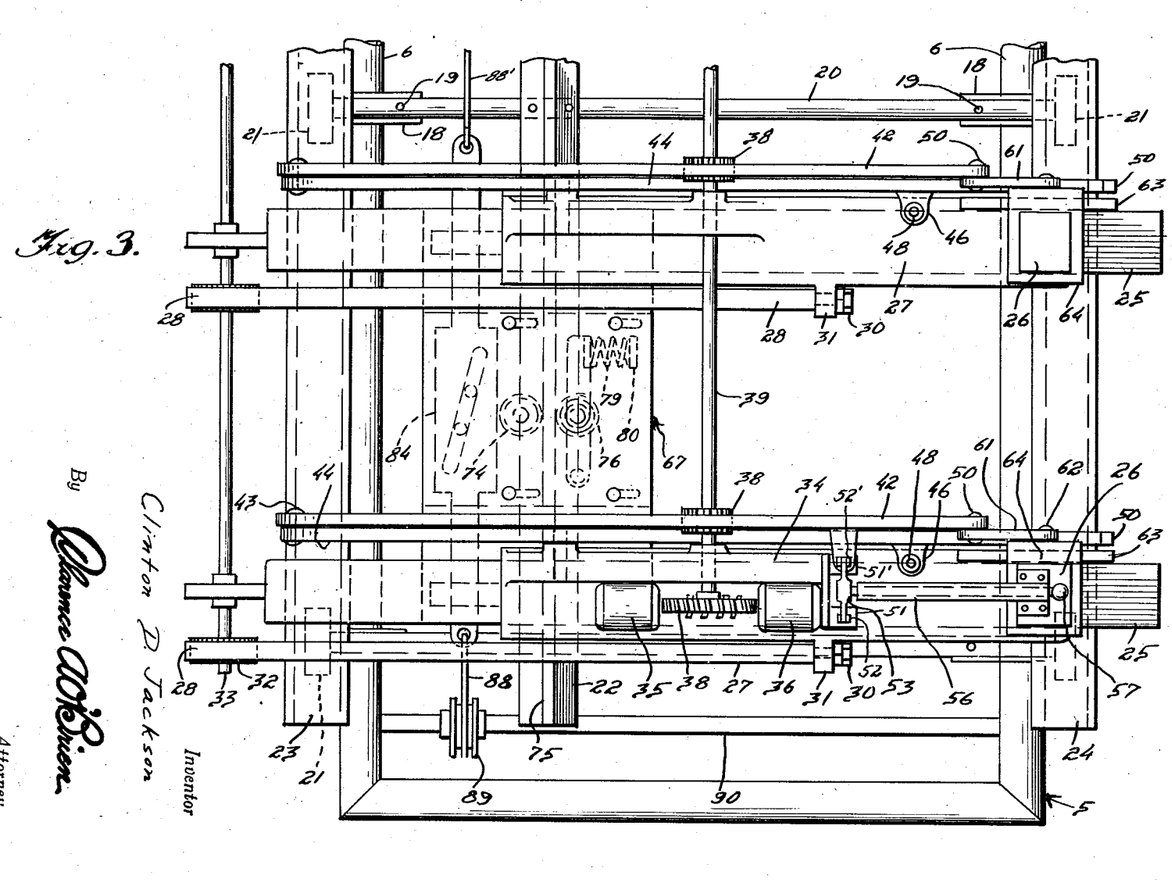
Figure 3 is an enlarged fragmentary top plan view of the carriage showing two of the electrically operated dogs.

Another vertical rod 52' like the rod 52 has its upper end connected to the opposite end of the cross lever 53 (see Figure 3) and its lower end to a switch 51' the body of which is secured to the lower arm 44 and so arranged that upward movement of the arm 44 against the spring 47 causes the switch 51' to open, thereby preventing undue strain on the gearing after the dog 50 has become engaged with the log 6'.

The switch operating rod 52 has a stop 58 located above a lug 59 on the right hand end portion of the upper lever 42 so that upon ascent of the lever the rod 52 will be thrust upward to release contact on switch 51 in a manner to be described herein.

The right hand extremity of the upper lever or jaw 42 is pivoted at 60 to a link 61 which has its lower end pivoted at 62 to a horizontally adjustable hook 63 which is slidably mounted on a slide 64 which works up and down on the standard 26. Notches 65 on the lower edge of the hook 63 engage an element 66 on the slide to hold the adjustment. The jaws or levers 42, 43 together form a pair of gripping tongs for the log 26.

Figure 11:
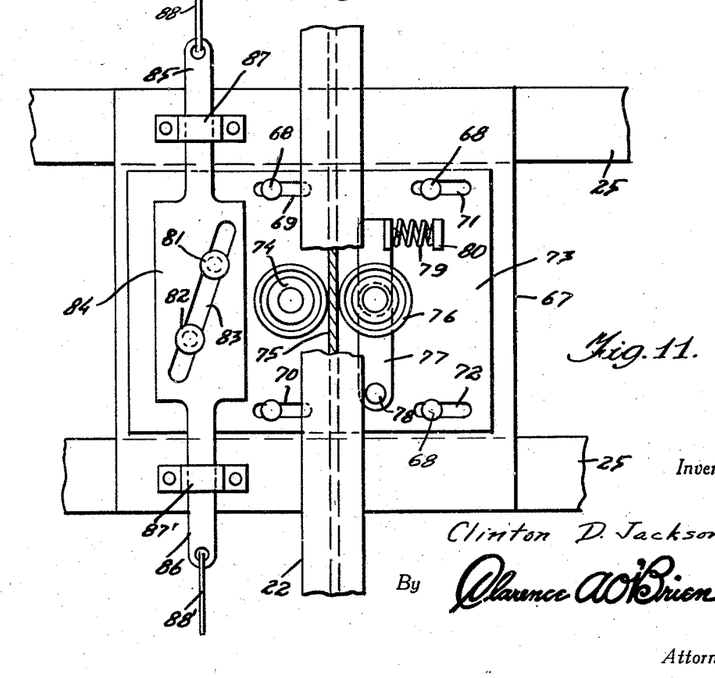
Figure 11 is a fragmentary bottom plan view of the guide rail and guide rail bearing assembly.

On the underside of the I-beams composing the carriage is attached a plate 67, shown in Figure 11, on which are headed lugs 68 engaging through transversely elongated slots 69, 70, 71 and 72, respectively, formed in a shiftable plate 73 which is held by the heads of the lugs against the bottom of the stationary plate 67. Depending from the shiftable plate 73 is a stationary roller 74 engaging one side of the web 75 of the guide rail 22 and a movable roller 76 engaging the opposite side of the web of the rail. The movable roller 76 is mounted on a lever 77 pivoted at one end at 78 to the shiftable plate 73 and engaged at its opposite end by a spring 79 expanding between the lever and a lug 80 on the shiftable plate. This arrangement allows limited sidewise yielding movement of the carriage relative to the guide rail 22 in the travel of the carriage along the top of the chassis frame in a sawing operation, whereby shock is absorbed which would otherwise impose severe strain on the device. Additional headed lugs 81 and 82 on the shiftable plate 73 work in a diagonal slot 83 formed in a longitudinal shiftable plate 84 having reduced end portions 85 and 86 slidably confined in retainers 87 and 87' secured to the bottom of the stationary plate 67 in front of and behind the shiftable plate 73. The ends of the carriage operating cable 88 are secured to the opposite ends of the shiftable plate 84. There are two of the track guide arrangements as described one at each end of the carriage with the adjacent ends of the shiftable plates 84 connected by a rod 88'.

The cable 88 is trained over a pulley 89 on a shaft 90 on the rear end of the chassis (Figure 1), passes under the carriage and is wrapped around a drum 91 on a drum shaft 92 supported on the upper side tubes of the chassis, and passes thence around a pulley 93 on a shaft 94 on the front end of the chassis.

The drum shaft 92 has a sprocket connected by a sprocket chain 95 with a sprocket on the shaft 96 which is mounted on the laterally projecting framework 97 composed of inner and outer longitudinal members 98 and 99 connected to the upper side tube 6 by transverse tubes 100 and 101. A shift lever 102 is pivoted on a bracket on the tube 101 and has pivoted thereto a connecting rod 103 pivoted at its opposite end to a shiftable bearing 104 mounted on the outer frame member 99. The outer end of the shaft 96 is journaled in the bearing and carries a large friction wheel 105, the remaining end of this shaft being sufficiently loosely journaled in a bearing 106 mounted on the frame member 98 to permit the shaft 96 to be shifted to engage the large friction wheel 105 with either the friction roller 107 or the friction roller 108. The friction roller 107 is carried between the frame members 99 and 101 and has a shaft having a sprocket over which is trained the sprocket chain 109. The chain 109 is also trained over a sprocket on the drive shaft 110 which carries the friction roller 108 journaled on the frame elements 99 and 98. The drive shaft also has the drive pulley 110' over which is trained the drive belt 111 operated by the power pulley on the tractor (not shown). The chain 109 is also trained over a sprocket on a shaft 112 supported from the frame member 100, the shaft 112 having a large belt pulley 112' operating a belt 113 trained over the pulley of the generator 145 which is supported from the frame member 100 and connected to charge the battery 137 (Figure 5). The chain 109 is also trained over an idler sprocket 114 supported below the frame member 99 to give the chain proper relation to the other sprockets over which the chain 109 is also trained (see Figure 2).

The described arrangement provides for constant running of the saw 108' positioned on the shaft 110 with sufficient slippage between the friction rollers 107 and 108 and friction wheel 105 to prevent unduly forced feeding of the carriage to drive the cable drum 91, at a predetermined relative rate.

Figure 7:
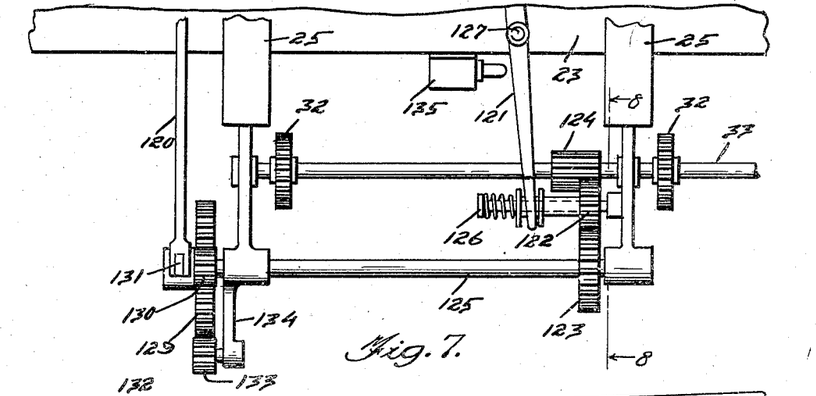
Figure 7 is an enlarged fragmentary top plan view of the set works and receder mechanism.
Figures 8, 9:
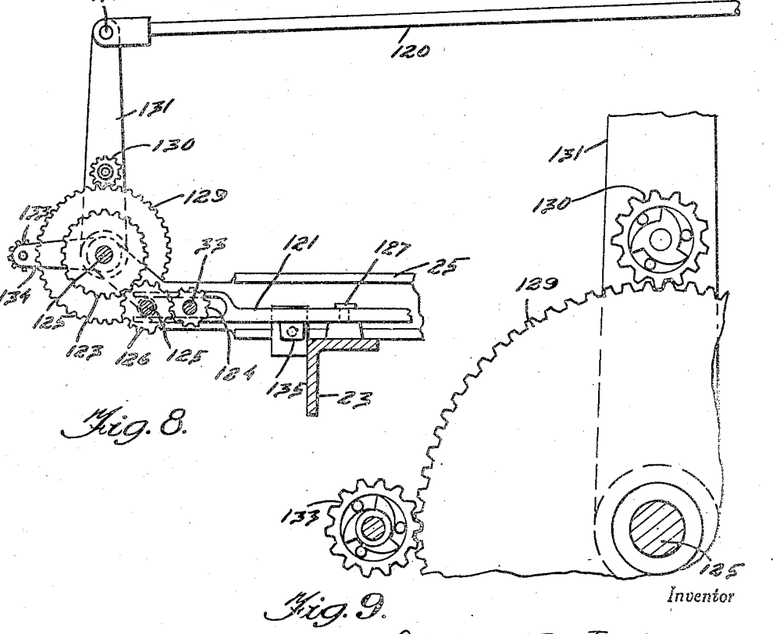
Figure 8 is a fragmentary transverse vertical sectional view taken along the line 8—8 of Figure 7 and looking toward the left in the direction of the arrows.
Figure 9 is an enlarged fragmentary sectional view showing details of the ratchet mechanism appearing in Figure 8.

Referring to Figures 1 and 7, 8 and 9, a manually operated rod 120 extends across the front of the carriage for manipulation by the operator to manually shift the carriage transversely when a clutch lever 121 is manually operated to move the idler gear 122 to the left in Figure 7 and out of mesh with the gear 123. The idler gear 122 continually engages the pinion 124 on the shaft 33. The gear 123 is fixed on the shaft 125 mounted parallel to the shaft 33 on extensions of the portions of the I-beams 25 which support the shaft 33, the idler gear 122 being slidable against the tension of a spring 128 on a countershaft 126 by engagement of the forked portion of the shift lever 121, the latter being pivoted at 127 on the side member 23.

The shaft 125 has fixed thereon a larger gear 129 which is turned by a ratchet gear 130 mounted on the lever 131 which swings on the shaft 125 and is pivoted at 132 to the rod 120. Another ratchet gear 133 is mounted on an arm 134 projecting from the support for the shaft 125 and is in mesh with the gear 129.

Figure 1:
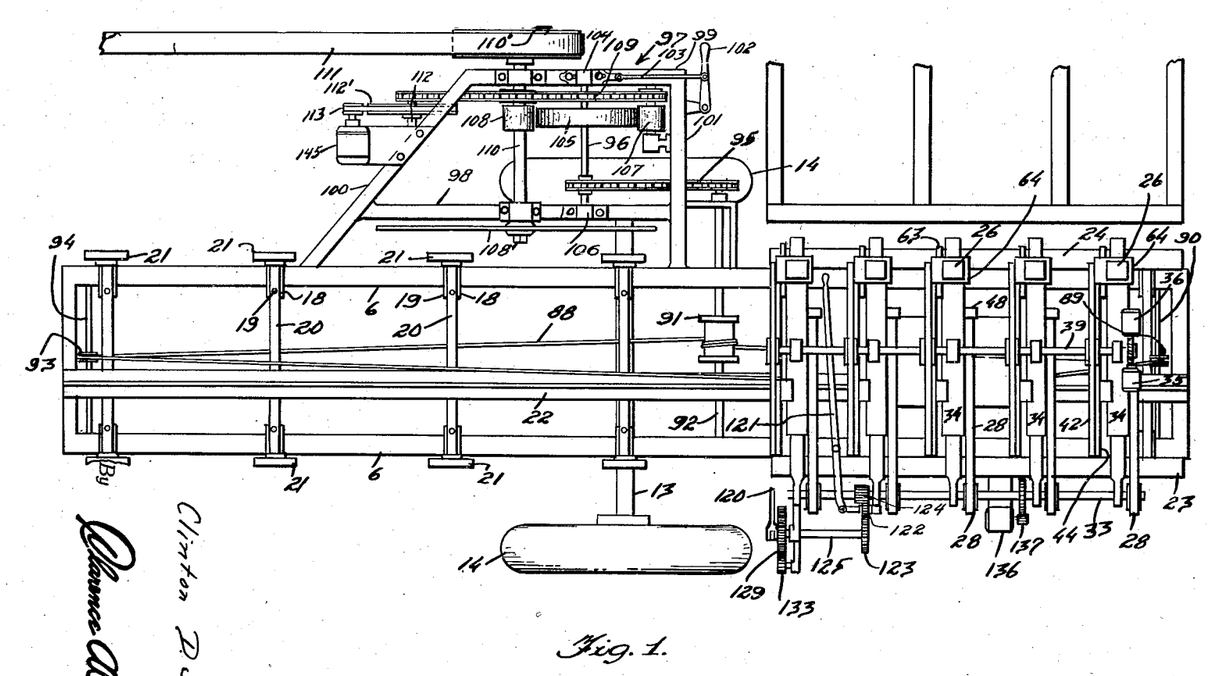
Figure 1 is a general top plan view of the embodiment.

Alongside the shift lever is a switch 135 of the spring pressed normally open type which is in circuit with the electric motor 136 which is operatively connected to the shaft 33 at 137 (in Figure 1). The switch is in such a position that the shift arm will engage and close it when disengaging the gear 122 from the gear 123, whereby the motor 136 is energized and the shaft 33 can turn freely.

As shown in Figure 5, the motor 136 has one side grounded to the frame of the device and its remaining side connectible through the switch 135 to one side of the ordinary automobile battery 137 which has its remaining side similarly grounded. The battery is mounted conveniently on the device and produces a sufficiently strong current for a short period to operate the motor 136 without requiring the provision of cumbersome and expensive current supply means.

Secured to one side of the rail 25 is an insulation block 137' which mounts a vertically projecting metallic block 138 formed in its top with an arcuate round cross section groove 139 into which projects an electrode 140 for engagement with the trolley wire 141 which slides through the groove as the carriage works back and forth, the said electrode being connected at 142 to one side of each of the switches 51, 51' whose remaining sides are separately connected to the ungrounded sides of the motors 36 and 35, respectively, as shown in Figure 5. The ends of the trolley wire are insulated from their supports and the trolley wire is connected to the ungrounded output terminal of a suitable current source, in this case the generator 145, which is suitably connected to charge the battery as intermittently required.

Operation

Having secured the mill in a level position by the use of jacks 17, Figure 2, the operator will proceed to slide the several upright standards into the desired position to receive the log by moving lever 121 sideways, causing 122 to disengage 123 and make contact at switch 135 energizing motor 136, thereby causing shaft 33 to rotate backwards, thereby causing pinions 32 which engage in rack 28 to move slides and standards into desired position. This accomplished, lever 121 is again moved to original position so that operating lever 131 is connected through the train of gears.

After the log has been placed in position on the I-beams 25 the dogs 63 are adjusted to the proper notch, the hand lever 57 is pressed backwardly or toward the forward movement of the carriage which is the natural direction in order to engage the saw in the log. This movement of 57 causes a downward movement of the cross arm 54 on the back end, forcing rod 52 connecting it to the switch 51' to close the circuit to motor 36, which through gear train and lever 42 forces 63 into the upper part of the log. The upper lever 42 being pivoted to 44 at 43, a continued movement in this direction will cause to move downwardly at point 43 and upwardly at 50, engaging the hook 50 with the lower part of the log.

The switch 51' making this connection is so connected to arm 44 that when the hook 50 engages the log sufficiently to compress the spring 47, the arm 44 trips said switch, breaking the circuit to the motor 36 and thereby locking all of the gears and levers in said position by reason of the arrangement of irreversible gears 38 and 37.

The operator is now ready to bring the log out in line with the saw by a movement forwardly and backwardly of lever 120.

With the log now in proper position to go into the saw the operator moves lever 102 toward the left, causing 105 to engage with 108 which is revolving with the saw which in turn causes 105 to rotate in the opposite direction from the saw and through shaft 96, chain 95, drum 91, cable 88, which is secured to 84 causing this part to move diagonally along to the end of the slot 83. The carriage is thereby moved to its extreme right hand position with reference to Figure 4 and moves longitudinally along the wheels 21 toward the saw 108'. Further rotation of 105 then causes the log to pass over the saw 108'.

When the saw has passed completely through the log and the operator desires to return the carriage he moves lever 102 in the opposite direction, disengaging 105 from 108 and into engagement with 107, thereby causing 96 to rotate in the opposite direction and thereby reversing all subsequent operations, including that of causing the carriage to seemingly step away from the saw on its return, thereby eliminating the scratching of the face of the log by the saw on its return as the case would be, had this "step back" movement not taken place.

The operator then by movement of lever 120 again pulls the log out the desired amount and repeats the operation until the last board is to be removed. Then a movement in the forward direction on lever 57 causes rod 52 to close switch 51 to operate the motor 35 which through the gear train raises 42 and by the linkage 60 and 61 raises 63. This release at once allows spring 47 to bring 44 and 50 toward their normal disengaged positions and the movement of 42 continues upwardly until 58 contacts 59 thrusting upwardly on 52, opening the switch 51 and leaving the dogs again in a position to receive another log, and the cycle is again repeated.

Although I have shown and described herein a preferred embodiment of my invention it is to be understood that I do not wish to limit the application of my invention thereto, beyond the scope of the subjoined claim.

Having described the invention, what is claimed as new is:

In a saw mill having a chassis frame and a log carriage movable therealong, log handling means on said carriage, said log handling means comprising a base fixed on the carriage, head blocks, movable knees and relatively movable upper and lower dogging means, each of said head blocks comprising a horizontal slide, a horizontal transversely arranged slideway on said carriage on which the slide is adjustable across the carriage in accordance with the diameter of the log to be sawn, manually operated mechanical means for operating said slides into adjusted positions, means for operating the upper and lower dogs for reciprocal action to engage the top and bottom of the log, and electrically operated means for moving the dogging means, said electrically operated means comprising switch means arranged to be effectively engaged by a part on said upper dog for initiating and limiting operation of said upper dog, said dogging means comprising upper and lower arms hinged together at the apex to form an open V, the lower arm terminating with a fixed hook and the upper arm terminating with a link and second hook hinged on said link and slidable on said knee.

CLINTON D. JACKSON.